United States Patent
Liu et al.

(10) Patent No.: US 7,726,009 B1
(45) Date of Patent: Jun. 1, 2010

(54) METHOD OF FABRICATING A PERPENDICULAR RECORDING WRITE HEAD HAVING A GAP WITH TWO PORTIONS

(75) Inventors: Yinshi Liu, Foster City, CA (US);
Benjamin Chen, San Jose, CA (US);
Kyusik Sin, Pleasanton, CA (US);
Hongping Yuan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 366 days.

(21) Appl. No.: 11/779,218

(22) Filed: Jul. 17, 2007

Related U.S. Application Data (63) Continuation of application No. 10/837,350, filed on Apr. 30, 2004, now Pat. No. 7,248,431.

(51) Int. Cl.
*G11B 5/187* (2006.01)
(52) U.S. Cl. ............ 29/603.11; 29/603.13; 29/603.18; 216/22; 216/41
(58) Field of Classification Search .............. 29/603.11, 29/603.12, 603.13, 603.18; 216/22, 41, 48, 216/66, 94; 360/119–122, 125, 126
See application file for complete search history.

(56) References Cited

U.S. PATENT DOCUMENTS

| | | |
|---|---|---|
| 4,656,546 A | 4/1987 | Mallory |
| 5,075,956 A | 12/1991 | Das |
| 5,111,352 A | 5/1992 | Das et al. |
| RE33,949 E | 6/1992 | Mallary et al. |
| 6,282,056 B1 | 8/2001 | Feng et al. |
| 6,493,926 B2 * | 12/2002 | Han et al. ............. 29/603.13 X |
| 6,504,675 B1 | 1/2003 | Shukh et al. |
| 2002/0044380 A1 | 4/2002 | Kakehi et al. |
| 2002/0078554 A1 | 6/2002 | Kobayashi |
| 2002/0080523 A1 | 6/2002 | Sato et al. |
| 2002/0080525 A1 | 6/2002 | Sato et al. |
| 2004/0042118 A1 | 3/2004 | Notsuke et al. |
| 2005/0190479 A1 | 9/2005 | Terris et al. |

(Continued)

FOREIGN PATENT DOCUMENTS

EP    747887 A2 *  12/1996

(Continued)

OTHER PUBLICATIONS

M. Mallary et al., "One Terabit per Square Inch Perpendicular Recording Conceptual Design", IEEE Transactions on Magnetics, vol. 38, No. 4, pp. 1719-1724, Jul. 2002.

*Primary Examiner*—A. Dexter Tugbang (57) ABSTRACT

A method of fabricating a write head for perpendicular recording includes forming a pole layer on an undercoat layer, forming a mask over at least a portion of the pole layer, and forming the pole by removing material from the pole layer. The method further includes forming a first gap portion of a gap along a first side and a second side of the pole, forming a protective layer over at least a portion of the first gap portion, removing the mask, and removing the protective layer. The method further includes forming a second gap portion of the gap over at least a top surface of the pole and forming a shield over at least the second gap portion.

27 Claims, 11 Drawing Sheets

U.S. PATENT DOCUMENTS

| | | |
|---|---|---|
| 2006/0109588 A1 | 5/2006 | Le et al. |
| 2006/0171073 A1 | 8/2006 | Kobayashi |

FOREIGN PATENT DOCUMENTS

| | | | | |
|---|---|---|---|---|
| GB | 2392297 A | | 2/2004 | |
| JP | 02201710 A | | 8/1990 | |
| JP | 02254611 A | * | 10/1990 | ................ 216/22 |
| JP | 2004079081 A | | 3/2004 | |
| JP | 2004095006 A | | 3/2004 | |

* cited by examiner

METHOD OF FABRICATING A PERPENDICULAR RECORDING WRITE HEAD HAVING A GAP WITH TWO PORTIONS

CROSS-REFERENCE TO RELATED APPLICATIONS

This application is a continuation of U.S. patent application Ser. No. 10/837,350, filed Apr. 30, 2004, now U.S. Pat. No. 7,248,431 incorporated by reference in its entirety.

BACKGROUND OF THE INVENTION

1. Field of the Invention

The present invention relates generally to perpendicular recording write heads and method of fabricating such write heads.

2. Description of the Related Art

Recording densities of magnetic hard drives continue to increase to meet the increasing desired storage requirements. Single-pole-type perpendicular recording is a technology which has the potential of achieving areal densities of greater than or equal to approximately 120 Gigabytes/square inch (e.g., 160 Gigabytes/square inch). In such single-pole-type perpendicular recording, magnetic flux passes from a tip of a first pole into the magnetic media, travels through the magnetically-soft underlayer beneath the magnetic media, and returns to a second pole. Examples of such a single-pole-type perpendicular recording technology are described by M. Mallary, A. Torabi, and M. Benakli, "One Terabit per Square Inch Perpendicular Recording Conceptual Design," *IEEE Transactions on Magnetics*, Vol. 38, pp. 1719-1724 (2002), which is incorporated in its entirety by reference herein, and U.S. Reissue Pat. No. 33,949, which is incorporated in its entirety by reference herein and which is a reissue of U.S. Pat. No. 4,656,546 issued to Mallary et al.

SUMMARY OF THE INVENTION

In certain embodiments, a method of fabricating a write head for perpendicular recording is provided. The write head comprises a pole, a shield in proximity to the pole, and a gap between the pole and the shield. The method comprises forming a pole layer on an undercoat layer. The method further comprises forming a mask over at least a portion of the pole layer. The method further comprises forming the pole by removing material from the pole layer. The pole has a top surface, a first side, and a second side. The method further comprises forming a first gap portion of the gap along the first side and along the second side of the pole. The method further comprises forming a protective layer over at least a portion of the first gap portion. The method further comprises removing the mask. The method further comprises removing the protective layer. The method further comprises forming a second gap portion of the gap over at least the top surface of the pole. The method further comprises forming the shield over at least the second gap portion.

In certain embodiments, a write head for perpendicular recording is provided. The write head comprises a pole having a top surface, a first side, and a second side. The write head further comprises a shield over the pole. The write head further comprises a gap between the pole and the shield. The gap comprises a first gap portion along the first side of the pole and along the second side of the pole. The first gap portion comprises a first gap material. The gap further comprises a second gap portion over at least the top surface of the pole. The second gap portion comprises a second gap material different from the first gap material.

In certain embodiments, a write head for perpendicular recording is provided. The write head comprises an undercoat layer and a pole positioned on the undercoat layer. The pole has a substantially flat top surface and a substantially flat bottom surface. Substantially all of the bottom surface is in contact with the undercoat layer.

DETAILED DESCRIPTION OF THE PREFERRED EMBODIMENT

Figure 1A:
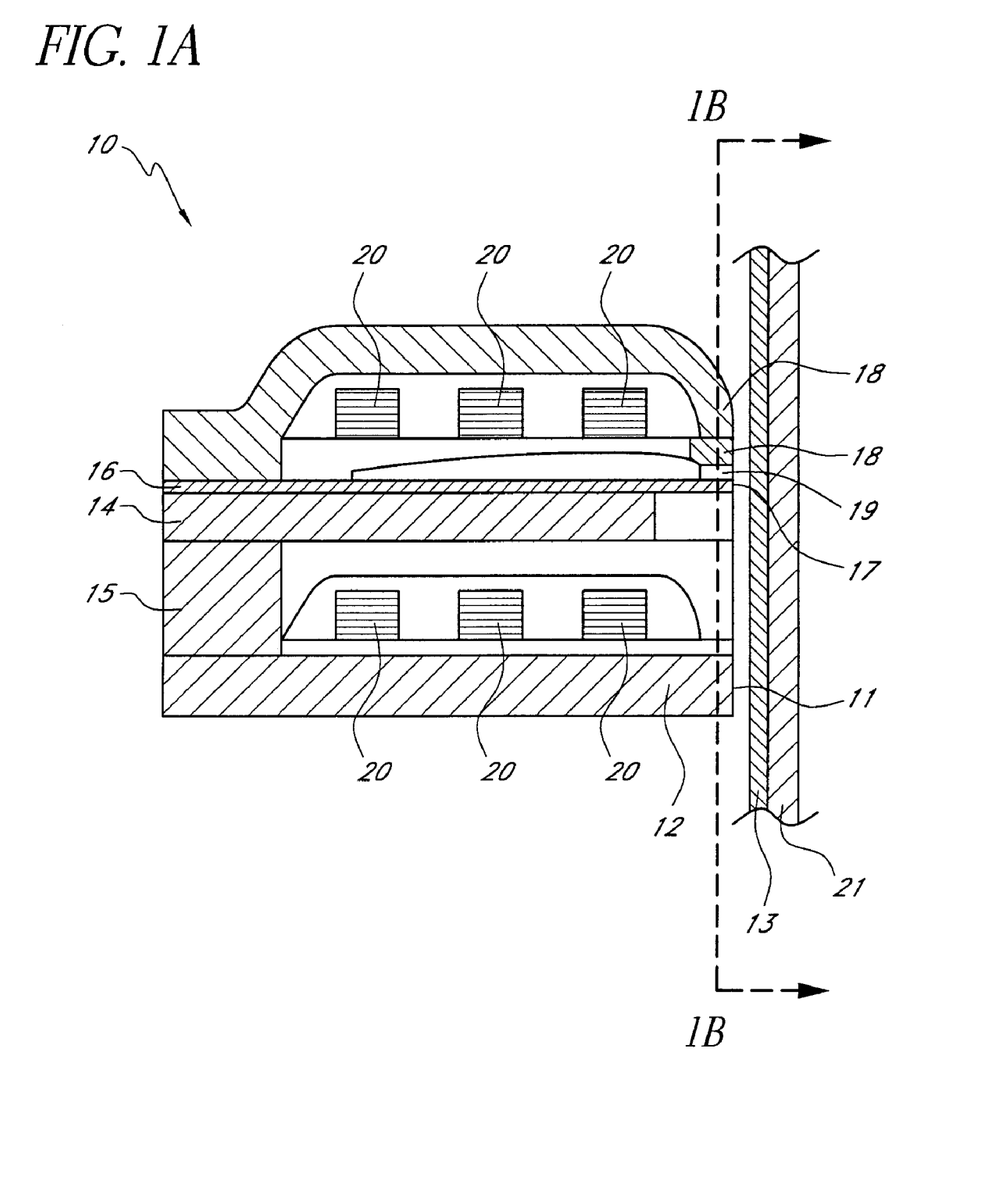
FIG. 1A schematically illustrates a cross-sectional view of a shielded single-pole-type perpendicular recording write head compatible with embodiments described herein.

FIG. 1A schematically illustrates a cross-sectional view of a shielded single-pole-type perpendicular recording write head 10 compatible with embodiments described herein. As used herein, the term "single-pole-type" refers to write heads for which a sufficiently strong magnetic flux at the magnetic medium is created beneath a single pole to record information on the magnetic media. The write head 10 comprises a first pole 12 in proximity to the magnetic medium 13 at an air-bearing surface 11. The write head 10 further comprises a second pole 14 magnetically coupled to the first pole 12 through a back gap region 15. The write head 10 further comprises a third pole 16 magnetically coupled to the second pole 14 and having a tip 17 which is in proximity to the magnetic medium 13 at the air-bearing surface 11. The write head 10 further comprises a shield 18 which comprises one or more shield portions in proximity to the tip 17 of the third pole 16. The shield 18 is spaced from the tip 17 of the third pole 16 by a gap 19 which comprises a gap material. The write head 10 further comprises electrically conductive coils 20 electrically isolated from other portions of the write head 10 and which generate magnetic flux in the second pole 14 and in the third pole 16. During a recording operation, magnetic flux generated by the coils 20 flows from the second pole 14 to the tip 17 of the third pole 16, across the spacing between the tip 17 and the magnetic medium 13, along a soft-magnetic underlayer 21 below the magnetic medium 13, and back to the first pole 12 (with part of the magnetic flux going to the shield 18 and the gap 19), thereby completing a magnetic flux circuit.

Figure 1B:
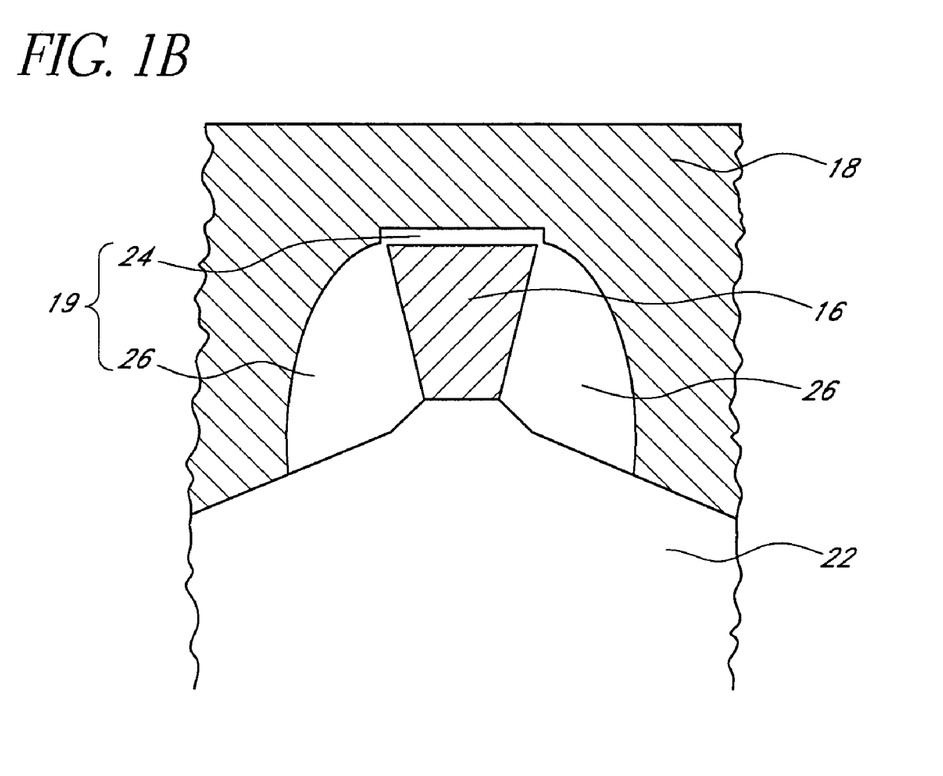
FIG. 1B schematically illustrates a cross-sectional view of a third pole and a shield of the write head of FIG. 1A shown in proximity to the air-bearing surface in accordance with certain embodiments described herein.

FIG. 1B schematically illustrates a cross-sectional view of the third pole 16 and the shield 18 in proximity to the air-bearing surface 11 in accordance with embodiments described herein. The pole 16 of FIG. 1B is on an undercoat layer 22 (e.g., alumina). The gap 19 between the pole 16 and the shield 18 comprises a top gap 24 and a side gap 26 on either side of the pole 16.

In the embodiment illustrated by FIG. 1B, the pole 16 has a generally trapezoidal cross-sectional shape. For high-density recording where track distances become small, such a trapezoid-shaped pole 16 advantageously reduces the degree of adjacent track erasing (ATE), and allows a thicker pole to be used without creating ATE, as compared to rectangle-shaped or square-shaped poles. The trapezoidal pole shape thus advantageously improves overwrite performance. Such trapezoid-shaped poles are described by U.S. Pat. No. 6,504,675 and U.S. patent application Ser. No. 09/933,508, each of which is incorporated in its entirety by reference herein.

The shield 18 also advantageously improves the linear recording density by providing a higher write field gradient (dH/dz) which reduces the size of the transition regions (i.e., sharpening the transitions) between the recorded bits. Such sharper transitions can improve the linear recording density and can reduce the influence of media noise. The sharpness of the transition regions is dependent on the uniformity of the top gap 24 between the pole 16 and the shield 18, so it is desirable to fabricate write heads 10 having generally uniform top gaps 24.

Figure 2A:
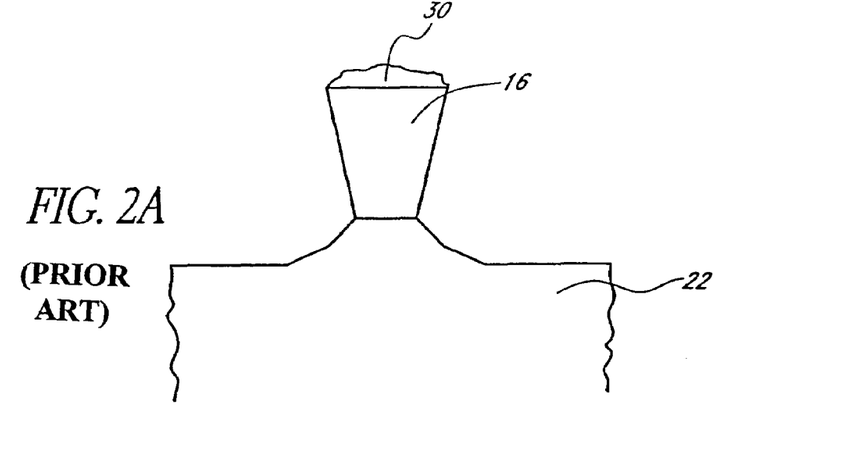
FIGS. 2A and 2B and FIGS. 2A and 2C schematically illustrate two alternative prior art methods of fabricating a pole.
Figure 2B:
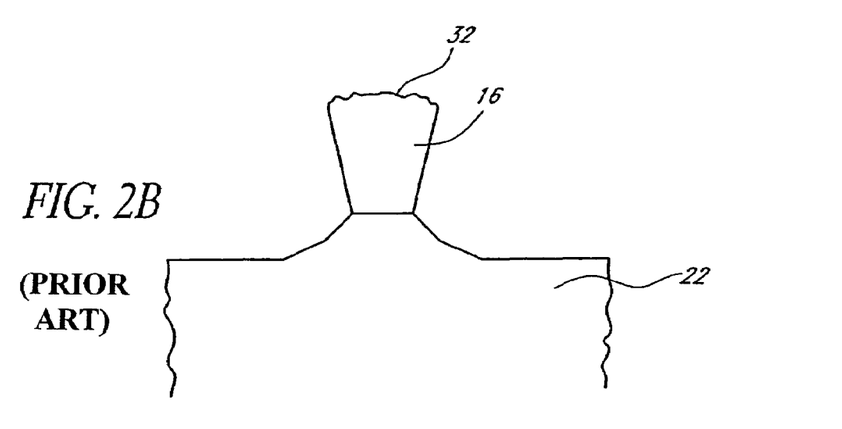
Figure 2C:
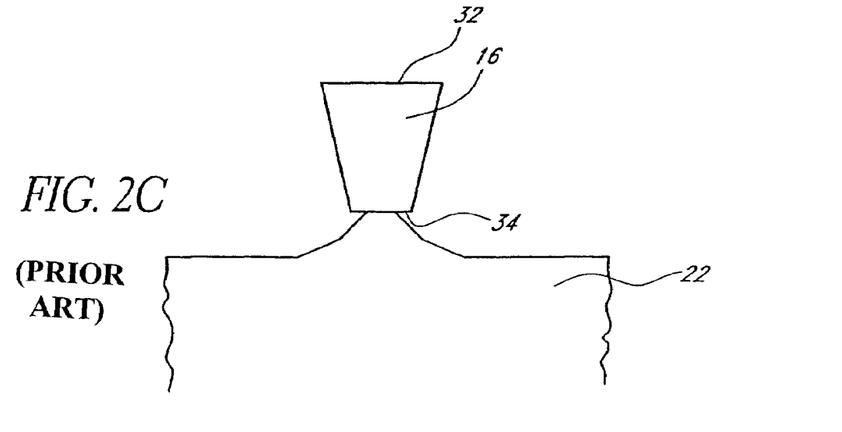

FIGS. 2A-2C schematically illustrate two alternative prior art methods of fabricating a pole 16. FIG. 2A schematically illustrates a pole 16 having a residual mask 30 on top of the pole 16. The generally trapezoidal cross-sectional shape of the pole 16 is formed by placing a mask 30 comprising an ion-milling-resistant material (e.g., alumina) on the pole 16 and using an ion milling process to remove material from the pole 16, resulting in the structure schematically illustrated by FIG. 2A. However, the residual portion of the mask 30 on the top of the pole 16 is non-uniform and its thickness is not predictable. If left on the top of the pole 16, the residual portion of the mask 30 would cause non-uniformity and unpredictability of the top gap 24, thereby adversely affecting the performance of the subsequently-formed write head 10. Therefore, to form a substantially uniform top gap 24 with the desired thickness, the mask 30 of FIG. 2A is desirably removed prior to deposition of the gap material.

Using a ion-milling process or a reactive-ion-etching process to remove the mask 30 of FIG. 2A results in the structure schematically illustrated by FIG. 2B. The top surface 32 of the pole 16 after the removal process is rounded, predominantly at the edges of the top surface 32, such that the top surface 32 is no longer substantially flat. Such a damaged top surface 32 can result in lower recording densities, more noise, and more fringing than a pole 16 having a substantially flat top surface 32.

Using a wet etching process to remove the mask 30 of FIG. 2A results in the structure schematically illustrated by FIG. 2C. While the top surface 32 of the pole 16 remains substantially unaffected by the wet etching process, the wet etching process can undercut the undercoat layer 22 from beneath a bottom surface 34 of the pole 16. Such structures are undesirable because they are more fragile and they can leave voids in the structures formed by subsequent process steps.

Because of the above-described problems, removing the mask 30 is a significant challenge. It is desirable to remove the mask 30 without substantially degrading the sharpness or the flatness of the top surface 32 of the pole and without substantially affecting the undercoat layer 22.

Figure 3:
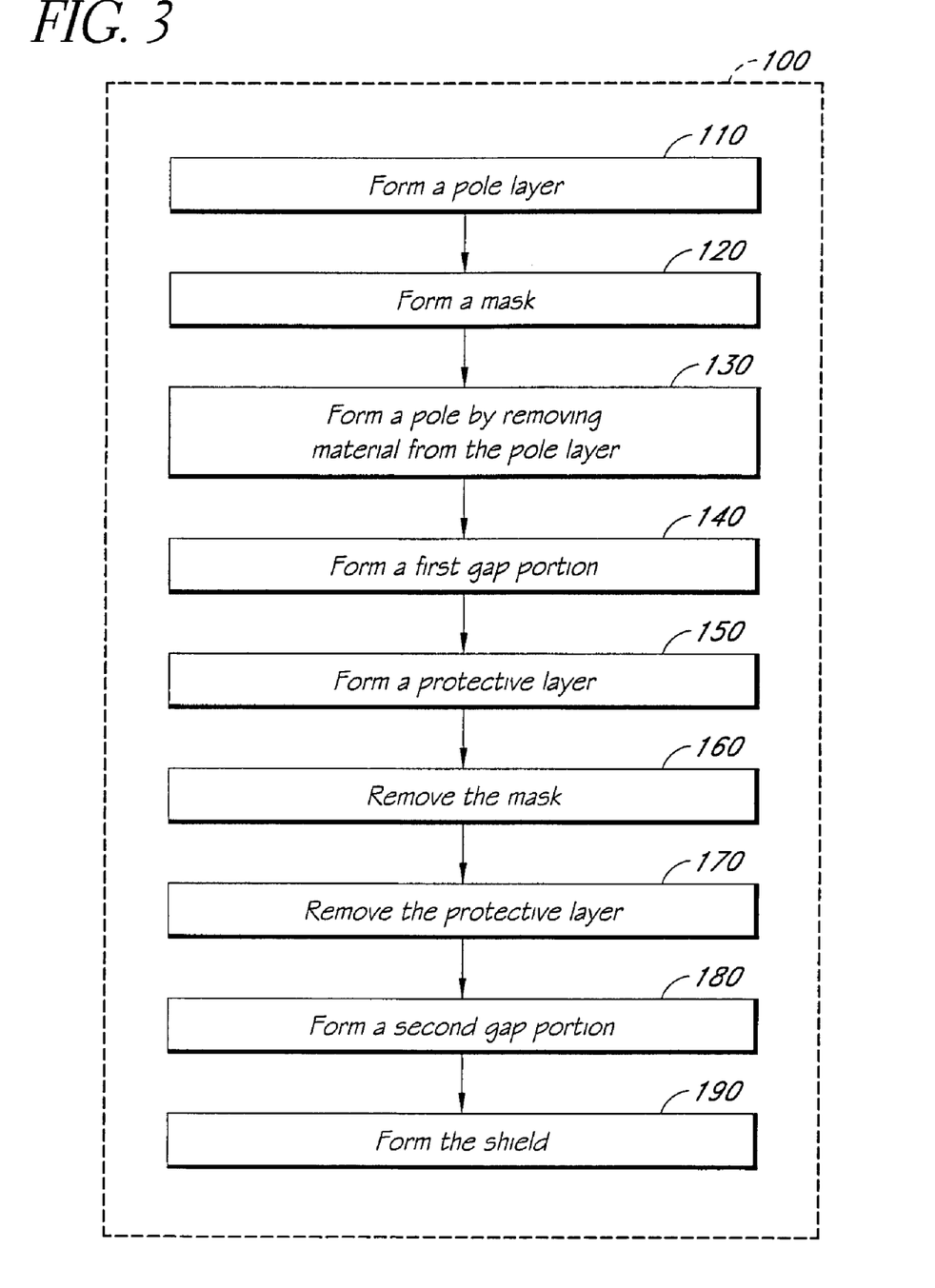
FIG. 3 is a flow diagram of an exemplary method of fabricating a write head for perpendicular recording in accordance with certain embodiments described herein.

FIG. 3 is a flow diagram of an exemplary method 100 of fabricating a write head 10 for perpendicular recording in accordance with embodiments described herein. The write head 10 comprises a pole 16, a shield 18 in proximity to the pole 16, and a gap 40 between the pole 16 and the shield 18. The method 100 is discussed herein by referring to FIGS. 4A-4P, which schematically illustrate various intermediate structures formed during the method 100. Other structures and write heads 10 are also compatible with embodiments described herein.

Figure 4A:
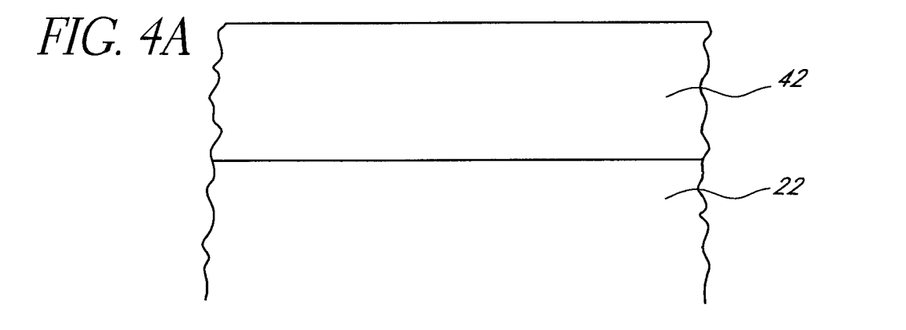
FIGS. 4A-4P schematically illustrate various intermediate structures formed during the method of FIG. 3.

In certain embodiments, the method 100 comprises forming a pole layer 42 on an undercoat layer 22 in an operational block 110, resulting in the structure schematically illustrated by FIG. 4A. The undercoat layer 22 of certain embodiments comprises alumina, while in other embodiments, the undercoat layer 22 comprises aluminum nitride, silicon oxide, silicon nitride, and other dielectric materials. The pole layer 42 is formed in certain embodiments by depositing a pole material onto the undercoat layer 22. Exemplary deposition techniques include, but are not limited to, DC or RF sputtering, ion-beam deposition, and plating. In certain embodiments, the pole material comprises CoFe, CoFeN, and CoNiFe. In certain embodiments, the pole layer 42 has a thickness in a range between approximately 0.05 micron and approximately 0.5 micron. Other materials and dimensions of the undercoat layer 22 and the pole layer 42 are compatible with embodiments described herein.

In certain embodiments, the method 100 further comprises forming a mask 50 over at least a portion of the pole layer 42 in an operational block 120. FIG. 5 is a flow diagram of an exemplary embodiment of the operational block 120, and FIGS. 4B-4F schematically illustrate structures corresponding to the embodiment of FIG. 5.

Figure 4B:
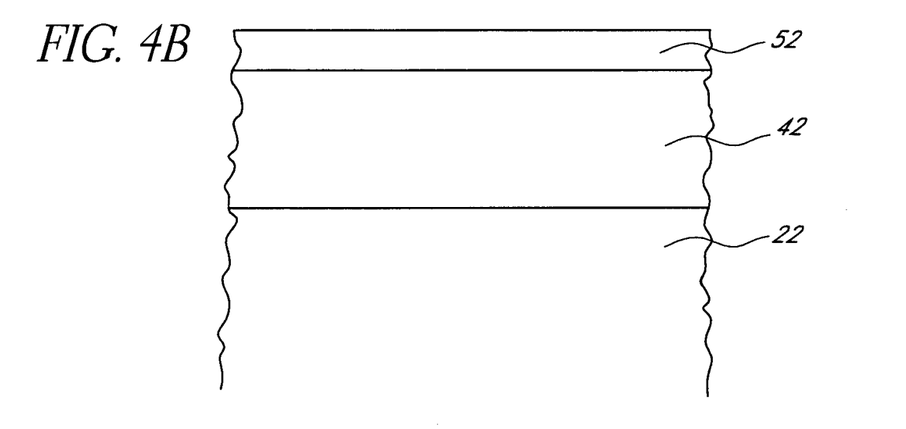
Figure 5:
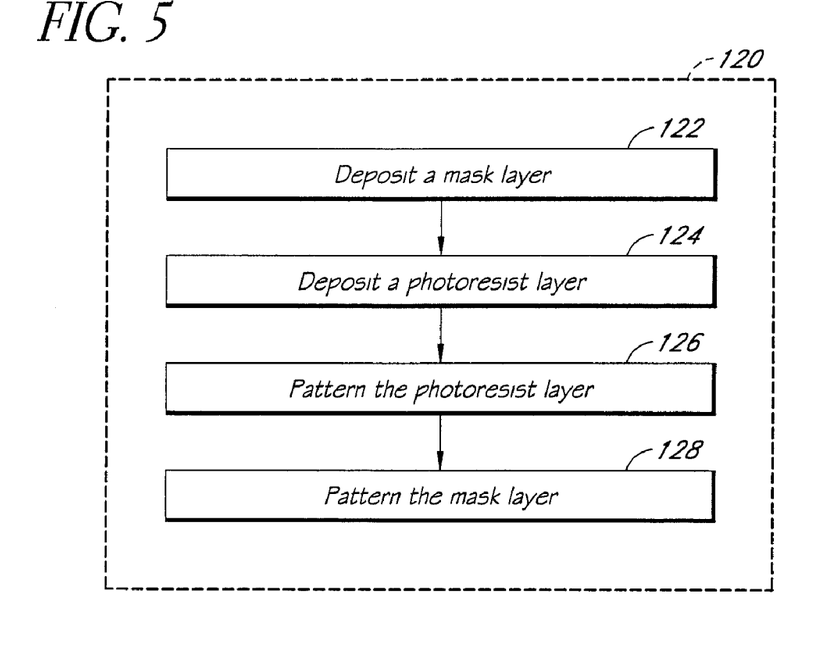
FIG. 5 is a flow diagram of forming a mask in accordance with certain embodiments described herein.

In certain embodiments, forming the mask 50 comprises depositing a mask layer 52 over the pole layer 42 in an operational block 122, as schematically illustrated by FIG. 4B. The mask layer 52 of certain embodiments comprises an ion-milling-resistant material, examples of which include, but are not limited to, alumina, tantalum, tantalum oxide, tungsten, titanium, and other materials having low ion beam etch rates. In certain embodiments, the mask layer 52 has a thickness in a range between approximately 0.1 micron and approximately 0.5 micron.

Figure 4C:
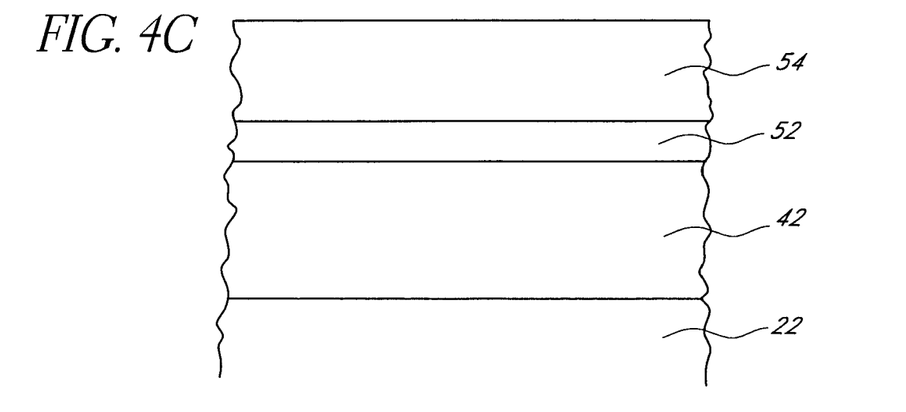

In certain embodiments, forming the mask 50 further comprises depositing a photoresist layer 54 over the mask layer 52 in an operational block 124, as schematically illustrated by FIG. 4C. Exemplary materials for the photoresist layer 54 in accordance with embodiments described herein include, but are not limited to, UV-210 available from Shipley Company, L.L.C. of Marlborough, Mass., a subsidiary of Rohm and Haas of Philadelphia, Pa. In certain embodiments, the photoresist layer 54 has a thickness in a range between approximately 0.2 micron and approximately 0.6 micron.

Figure 4D:
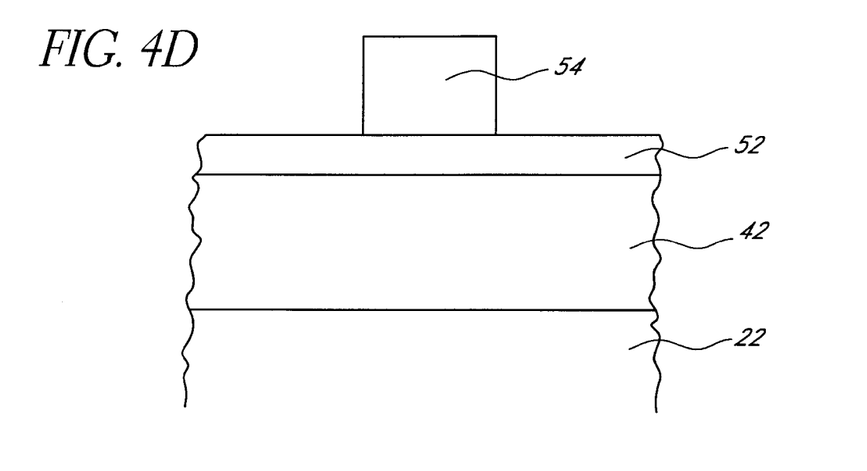

In certain embodiment, forming the mask 50 further comprises patterning the photoresist layer 54 in an operational block 126, as schematically illustrated by FIG. 4D. In certain such embodiments, the photoresist layer 54 is patterned by a photolithographic process as is known in the art. In certain embodiments, the photoresist layer 54 comprises a positive resist material, while in other embodiments, the photoresist layer 54 comprises a negative resist material.

Figure 4E:
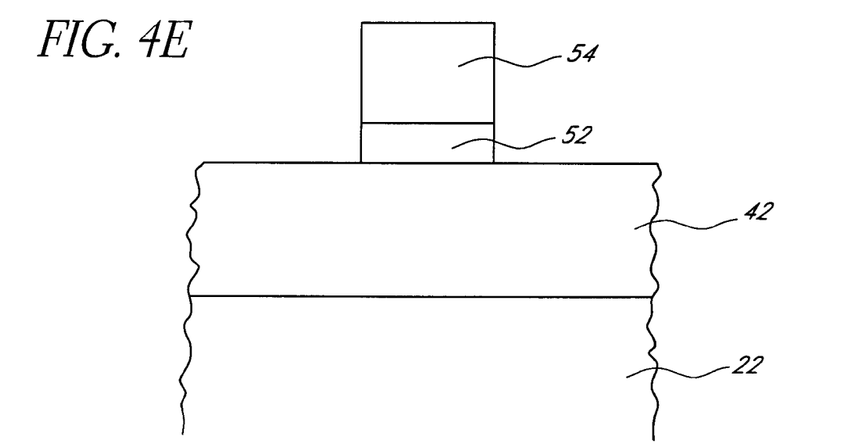
Figure 4F:
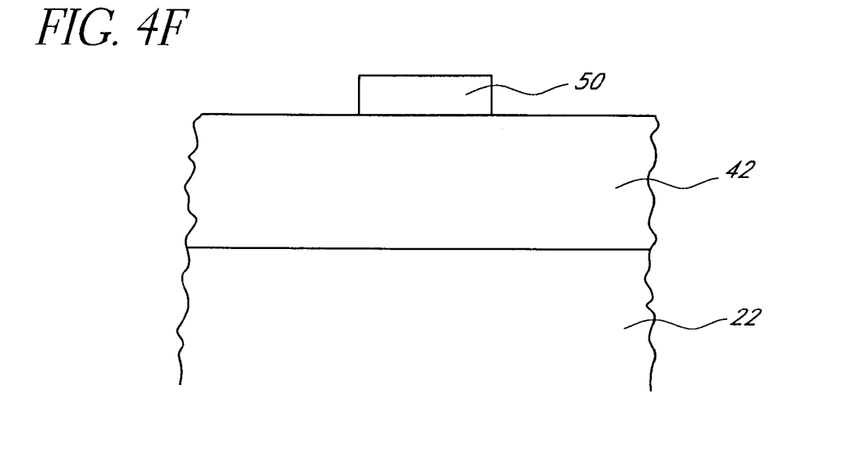

In certain embodiments, forming the mask 50 further comprises patterning the mask layer 52 in an operational block 128, as schematically illustrated by FIG. 4E. In certain embodiments, the mask layer 52 is patterned by exposing the structure of FIG. 4D to an etching process which removes the portions of the mask layer 52 that are not under the patterned photoresist layer 54, resulting in the structure of FIG. 4E. Exemplary etching processes compatible with embodiments described herein include, but are not limited to, ion-milling processes, reactive ion-etch processes, and other anisotropic etching processes which are known in the art. After removing the patterned photoresist layer 54, the portion of the mask layer 52 remaining on the pole layer 42 forms a mask 50, as schematically illustrated by FIG. 4F. In certain embodiments, the mask 50 has a width in a range between approximately 0.1 micron and approximately 0.4 micron. In addition, the mask 50 advantageously has substantially straight side walls that are approximately perpendicular to the underlying pole layer 42.

Figure 4G:
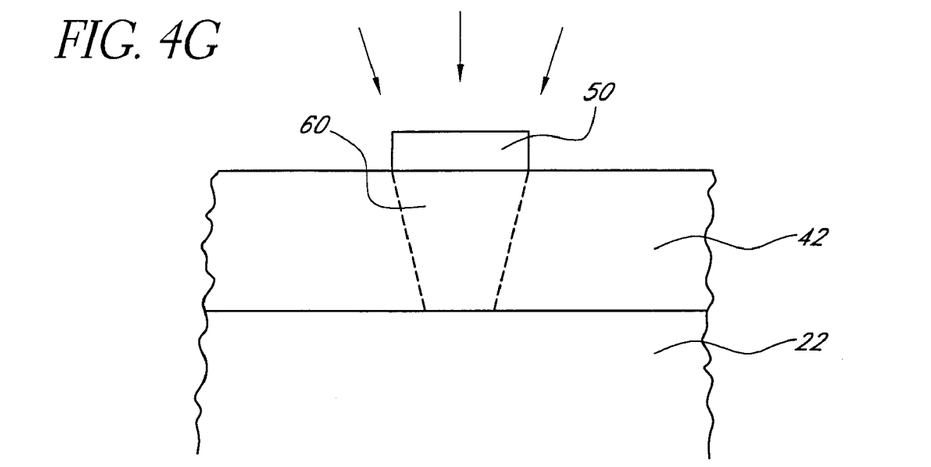
Figure 4H:
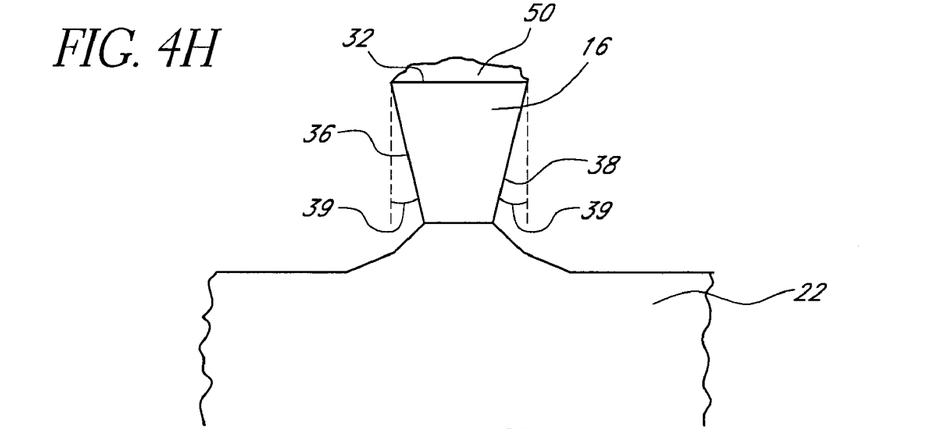

In certain embodiments, the method 100 further comprises forming the pole 16 by removing material from the pole layer 42 in an operational block 130. In certain embodiments, removing material from the pole layer 42 comprises ion-milling a portion of the pole layer 42 outside a shadow region 60 defined by the mask 50. In certain such embodiments, the portion of the pole layer 42 inside the shadow region 60 has a generally trapezoidal cross-sectional shape, as schematically illustrated by FIG. 4G. Other shapes of the pole 16 are compatible with embodiments described herein. As schematically illustrated by FIG. 4H, after the ion-milling process of certain embodiments, at least a portion of the mask 50 remains on the pole 16 and some material is removed from the undercoat layer 22. The pole 16 formed in the operational block 130 has a top surface 32, a first side 36, and a second side 38, as schematically illustrated by FIG. 4H. In certain embodiments, the top surface 32 of the pole 16 has a width in a range between approximately 0.1 micron and approximately 0.2 micron. The first side 36 and the second side 38 of certain embodiments forms an angle 39 from vertical in a range between approximately 5 degrees and approximately 15 degrees.

Figure 4I:
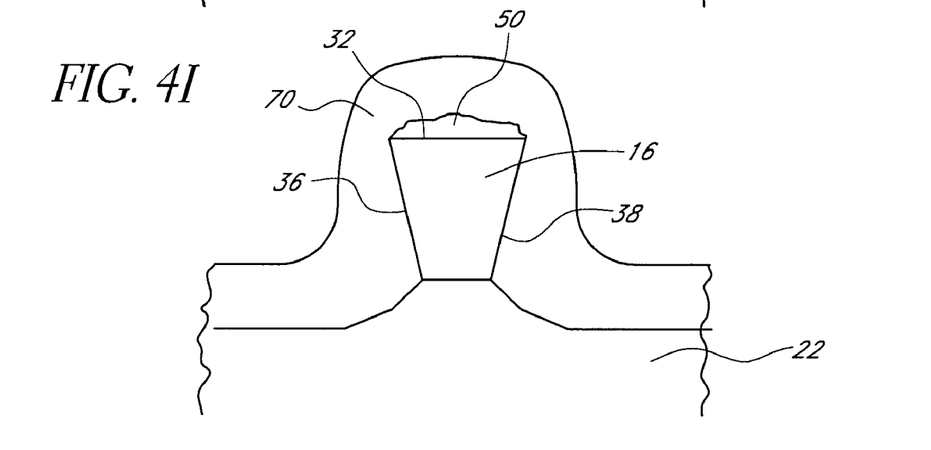
Figure 4J:
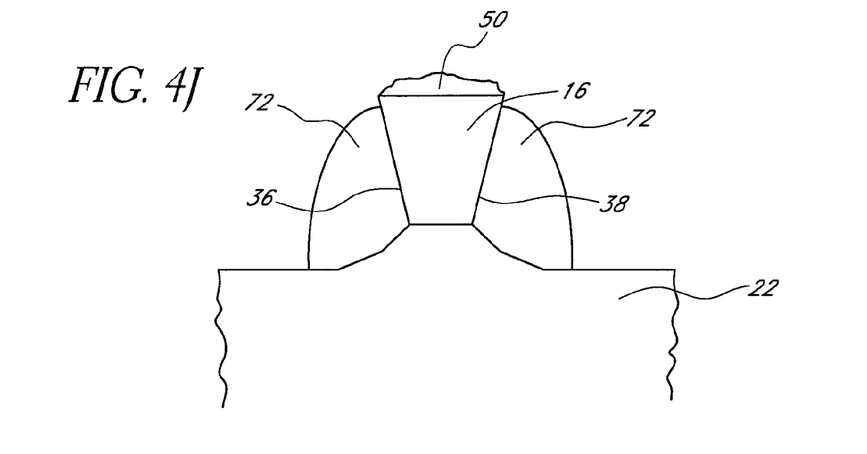
Figure 6:
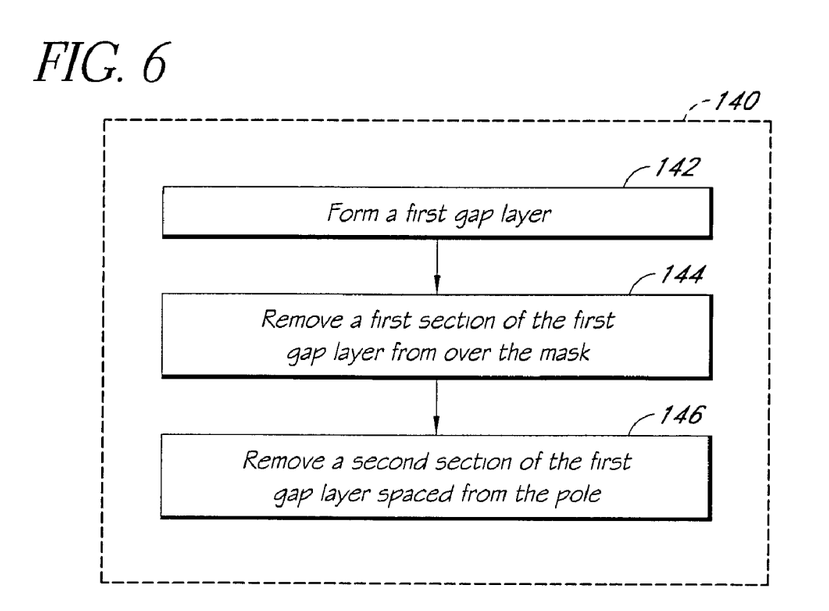
FIG. 6 is a flow diagram of forming a first gap portion of the gap in accordance with certain embodiments described herein.

In certain embodiments, the method 100 further comprises forming a first gap portion 72 of the gap 40 in an operational block 140. The first gap portion 72 is formed along the first side 36 and along the second side 38 of the pole 16. FIG. 6 is a flow diagram of an exemplary embodiment of the operational block 140, and FIGS. 4I and 4J schematically illustrate structures corresponding to the embodiment of FIG. 6.

In certain embodiments, forming the first gap portion 72 comprises forming a first gap layer 70 in an operational block 142. The first gap layer 70 comprises a first gap material and is formed over the mask 50 and over a portion of the undercoat layer 22 along the first side 36 and along the second side 38 of the pole 16, as schematically illustrated by FIG. 4I. The first gap material of certain embodiments comprises a non-magnetic dielectric material, which is preferably capable of being etched by reactive-ion-etching processes but which resists being etched by wet etching processes. Examples of first gap materials include, but are not limited to, silicon nitride, and silicon oxide. In certain embodiments, the first gap layer 70 is formed by a deposition process, examples of which include, but are not limited to, chemical-vapor deposition (CVD), plasma-enhanced chemical-vapor deposition (PECVD), high-pressure CVD, physical-vapor deposition (PVD), ion-beam deposition (IBD), inductively-coupled plasma (ICP) deposition, atomic-layer deposition (ALD), and spin coating. The first gap layer 70 of certain embodiments has a thickness in a range between approximately 1000 Angstroms and approximately 5000 Angstroms.

In certain embodiments, forming the first gap portion 72 further comprises removing a first section of the first gap layer 70 from over the mask 50 in an operational block 144. In certain such embodiments, the first section of the first gap layer 70 is removed from over the mask 50 by an anisotropic etching process. Examples of anisotropic etching processes compatible with embodiments described herein include, but are not limited to, directional reactive-ion-etching, ion-milling etching, and sputter etching. In certain embodiments, the anisotropic etching process has good selectivity for etching the first gap layer 70 while leaving the mask 50 and the pole 16 relatively unchanged.

In certain embodiments, forming the first gap portion 72 further comprises removing a second section of the first gap layer 70 spaced from the pole 16 in an operational block 146. In certain such embodiments, the second section of the first gap layer 70 is removed by an anisotropic etching process, examples of which are listed above. In certain embodiments, the first section of the first gap layer 70 and the second section of the first gap layer 70 are removed substantially simultaneously. FIG. 4J schematically illustrates a resulting structure of the first gap portion 72. The first gap portion 72 of such embodiments is along the first side 36 of the pole 16 and along the second side 38 of the pole 16.

Figure 4K:
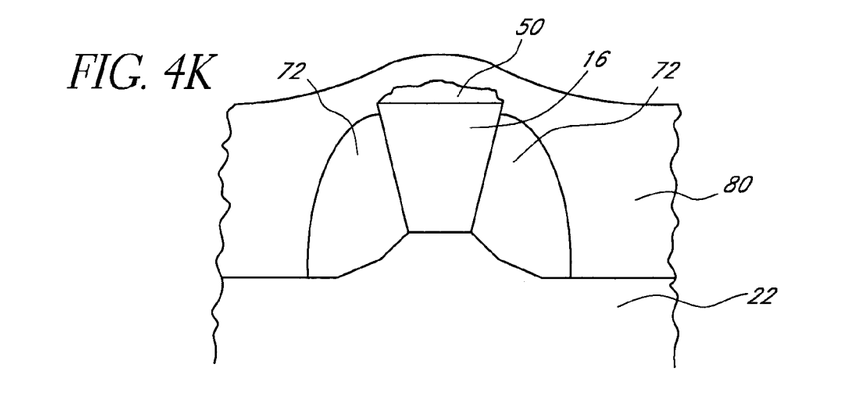
Figure 4L:
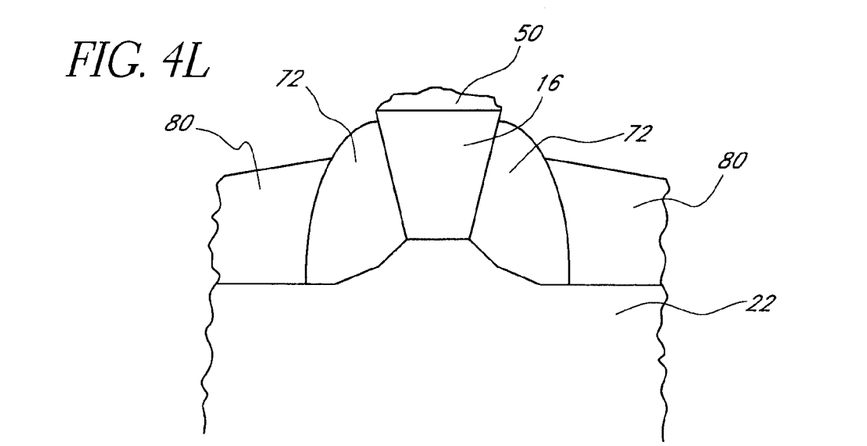

In certain embodiments, the method 100 further comprises forming a protective layer 80 over at least a portion of the first gap portion 72 in an operational block 150. In certain embodiments, the protective layer 80 comprises a photoresist material. The photoresist material of certain embodiments is an organic material that is preferably easy to planarize, has a low viscosity, is resistant to wet etching processes and is capable of being etched by reactive-ion etching processes. Examples of photoresist materials compatible with embodiments described herein include, but are not limited to, UV-210 (discussed above). Forming the protective layer 80 in certain embodiments comprises depositing the protective layer 80 over the mask 50 and over the first gap portion 72, as schematically illustrated by FIG. 4K. In certain such embodiments, the protective layer 80 is deposited by a spin-coating process, as is known in the art. The thickness of the protective layer 80 of certain embodiments is less than approximately 7000 Angstroms, typically in a range between approximately 3000 Angstroms and approximately 6000 Angstroms. In certain embodiments, forming the protective layer 80 further comprises removing a portion of the protective layer 80 from over the mask 50, as schematically illustrated by FIG. 4L. In certain such embodiments, removing the portion of the protective layer 80 comprises reactive-ion-etching with oxygen chemistry, as is known in the art.

Figure 4M:
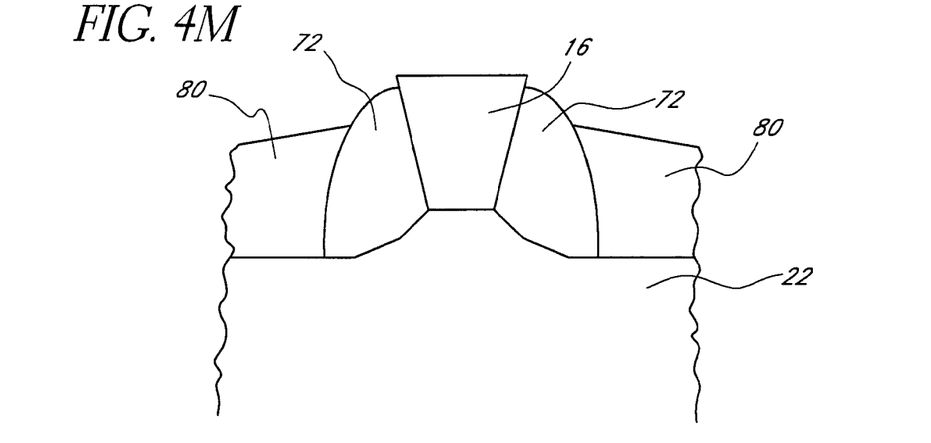

In certain embodiments, the method 100 further comprises removing the mask 50 in an operational block 160. In certain embodiments, the mask 50 is removed by wet etching as is known in the art. The wet etching process preferably removes substantially all of the mask 50 while leaving the pole 16 and the first gap portion 72 substantially unaffected, as schematically illustrated by FIG. 4M. Exemplary wet etching solutions compatible with embodiments described herein include, but are not limited to, NaOH-containing solutions. In certain embodiments, the pH of the wet etching solution is in a range between approximately 10 and approximately 11. Wet etching solutions with pH values which are too low are advantageously avoided to prevent etching or corroding of the pole 16.

Figure 4N:
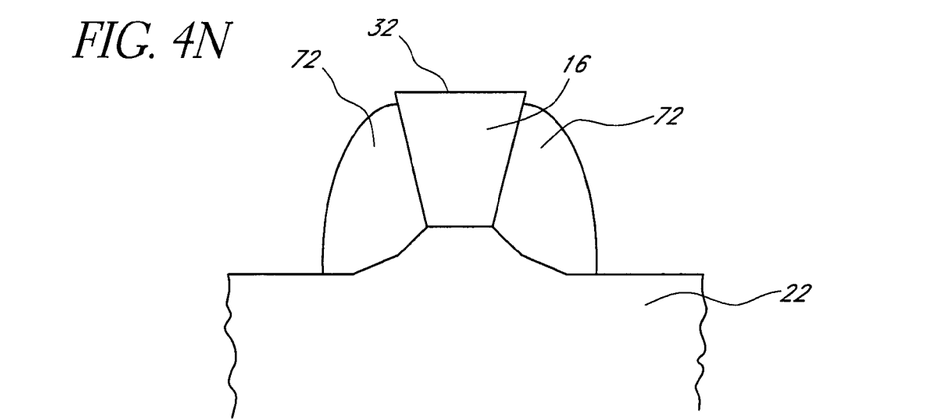

In certain embodiments, the method 100 further comprises removing the protective layer 80 in an operational block 170. In certain embodiments, the protective layer 80 is removed by resist stripping or plasma etching, both of which are known in the art. Exemplary chemicals for resist stripping to remove the protective layer 80 include, but are not limited to, N-Methyl-2-pyrrolidinone (NMP) and PRX127 (which is available from Shipley Company, L.L.C. of Marlborough, Mass., a subsidiary of Rohm and Haas of Philadelphia, Pa.). An exemplary plasma etching process utilizes a low-RF-power, high-pressure oxygen plasma dry etching chemistry to remove the protective layer 80 while avoiding substantial damage to other exposed layers. Substantially all of the protective layer 80 is preferably removed in the operational block 170 while leaving the pole 16, the first gap portion 72, and the undercoat layer 22 substantially unaffected, as schematically illustrated by FIG. 4N.

Figure 4O:
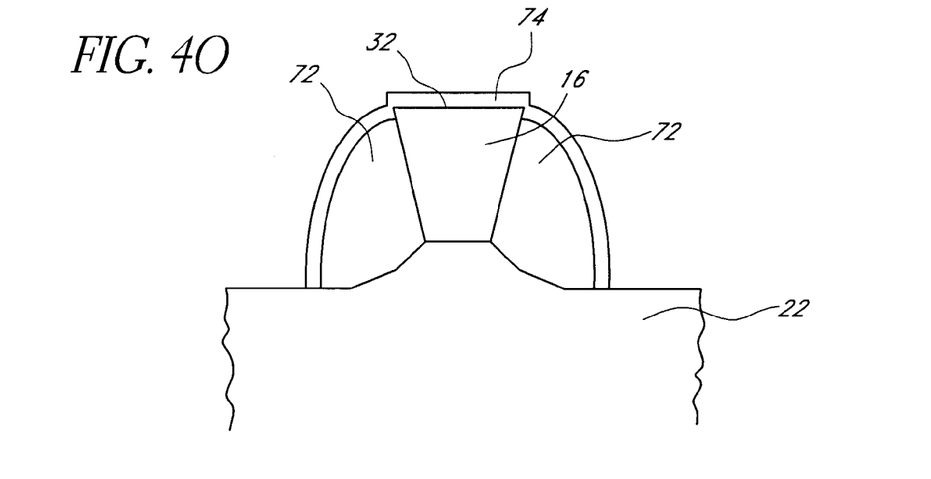

In certain embodiments, the method 100 further comprises forming a second gap portion 74 of the gap 40 over at least the top surface 32 of the pole 16 in an operational block 180. The second gap portion 74 is formed in certain embodiments by depositing a second gap material over at least the top surface 32 of the pole 16. In certain such embodiments, the second gap portion 74 is formed by also depositing the second gap material over the first gap portion 72, as schematically illustrated by FIG. 4O. Exemplary deposition techniques include, but are not limited to, atomic-layer deposition (ALD), sputter deposition, and ion-beam deposition. The second gap material of certain embodiments is a non-magnetic material. In certain embodiments, the second gap material is different from the first gap material. Examples of non-magnetic materials which are compatible with embodiments described herein include, but are not limited to, at least one of alumina, silicon oxide, silicon nitride, tantalum, tantalum oxide, nickel-chromium alloy, and nickel-niobium alloy. In certain embodiments, the second gap portion 74 has a thickness in a range between approximately 300 Angstroms and approximately 2000 Angstroms. In certain embodiments, the second gap portion 74 advantageously has sufficient uniformity, coverage, and conformality to provide a write head 10 having the desired performance.

Figure 4P:
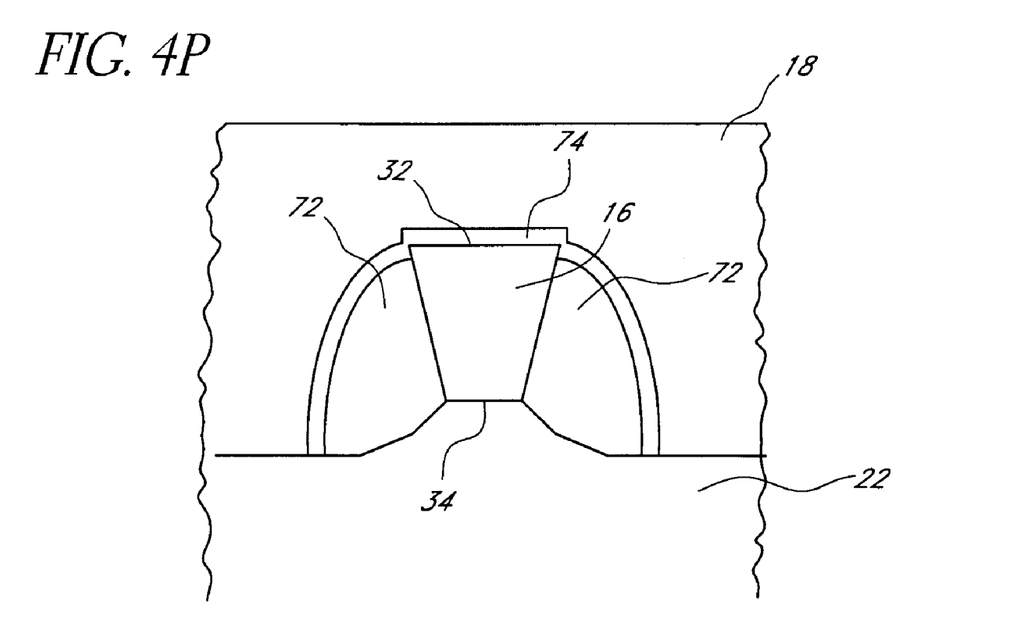

In certain embodiments, the method 100 further comprises forming the shield 18 over at least the second gap portion 74 in an operational block 190. In certain embodiments, the shield 18 is formed by depositing a magnetic material over the second gap portion 74, as schematically illustrated by FIG. 4P. Exemplary materials for the shield 18 include, but are not limited to, NiFe, NiFeCo, and other materials having a lower saturation moment than does the pole 16. Exemplary deposition techniques for forming the shield 18 include, but are not limited to, depositing a seed layer of NiFe or NiFeCo by ion-beam deposition followed by plating. Other deposition techniques known in the art are also compatible with embodiments described herein.

In certain embodiments, the write head 10 resulting from the method 100 has a pole 16 positioned on the undercoat layer 22. The top surface 32 of the pole 16 is substantially flat and the bottom surface 34 of the pole is also substantially flat. As schematically illustrated by FIG. 4P, substantially all of the bottom surface 34 is in contact with the undercoat layer 22. Such structures do not have the undercutting of the undercoat layer 22 which degrades the performance and reliability of write heads formed using prior art methods.

In certain embodiments, the materials of the first gap portion 72 and the second gap portion 74 are advantageously selected to provide desired physical properties for the gap 40. The first gap portion 72 is formed along the first side 36 and the second side 38 of the pole 16, an example of which is schematically illustrated in FIGS. 4J-4P. Therefore, the first gap material is advantageously selected to comprise a material which forms the desired shape in proximity to the pole 16 more easily. In addition, the first gap material is advantageously selected to comprise a material which has sufficiently good adhesion to the material (e.g., alumina) of the undercoat layer 22. In certain embodiments, the first gap material comprises at least one of silicon oxide or silicon nitride, each of which provides the relative ease of forming the desired shape of the first gap portion 72 in proximity to the pole 16 and which provides the desired adhesion to the undercoat layer 22.

The second gap portion 74 in certain embodiments provides a relatively thin separation between the top surface 32 of the pole 16 and the shield 18, as schematically illustrated by FIG. 4P. The thinness of the second gap portion 74 results in the second gap portion 74 having a larger influence on the reliability of the write head 10 than does the first gap portion 72. Therefore, in certain embodiments, the material of the second gap portion 74 is advantageously selected to be sufficiently stable to provide the desired reliability of the write head 10. In certain embodiments, the second gap material comprises at least one of alumina, tantalum, tantalum oxide, nickel-chromium alloy, or nickel-niobium alloy, each of which has sufficient stability to provide the desired reliability of the write head 10. In other embodiments, the second gap material comprises at least one of silicon oxide or silicon nitride. In certain such embodiments, the first gap material comprises silicon oxide and the second gap material comprises silicon nitride. In certain other such embodiments, the first gap material comprises silicon nitride and the second gap material comprises silicon oxide.

What is claimed is:

1. A method of fabricating a write head for perpendicular recording, the write head comprising a pole, a shield in proximity to the pole, and a gap between the pole and the shield, the method comprising:
    forming a pole layer on an undercoat layer;
    forming a mask over at least a portion of the pole layer;
    forming the pole by removing material from the pole layer, the pole having a top surface, a first side, and a second side;
    forming a first gap portion of the gap along the first side and along the second side of the pole, the first gap portion comprising a first gap material;
    forming a protective layer over at least a portion of the first gap portion;
    removing the mask;
    removing the protective layer;
    forming a second gap portion of the gap over at least the top surface of the pole, the second gap portion comprising a second gap material different from the first gap material; and
    forming the shield over at least the second gap portion.

2. The method of claim 1, wherein the undercoat layer comprises alumina.

3. The method of claim 1, wherein forming the pole layer comprises depositing a pole material onto the undercoat layer.

4. The method of claim 3, wherein the pole material comprises one of CoFe, CoFeN, or CoNiFe.

5. The method of claim 1, wherein forming the mask comprises:
    depositing a mask layer over the pole layer;
    depositing a photoresist layer over the mask layer;
    patterning the photoresist layer; and
    patterning the mask layer.

6. The method of claim 1, wherein the mask comprises an ion-milling-resistant material.

7. The method of claim 6, wherein the ion-milling-resistant material comprises one of alumina, tantalum, tantalum oxide, tungsten, or titanium.

8. The method of claim 1, wherein removing material from the pole layer comprises ion-milling a portion of the pole layer outside a shadow region defined by the mask.

9. The method of claim 8, wherein a portion of the pole layer inside the shadow region has a generally trapezoidal cross-sectional shape.

10. The method of claim 1, wherein forming the first gap portion comprises:
   forming a first gap layer over the mask and over a portion of the undercoat layer along the first side and along the second side of the pole, the first gap layer comprising the first gap material;
   removing a first section of the first gap layer from over the mask; and
   removing a second section of the first gap layer spaced from the pole.

11. The method of claim 10, wherein the first gap material comprises silicon nitride or silicon oxide.

12. The method of claim 10, wherein the first gap layer is formed by one of chemical-vapor deposition (CVD), plasma-enhanced chemical-vapor deposition (PECVD), high-pressure CVD, physical-vapor deposition (PVD), ion-beam deposition (IBD), inductively-coupled plasma (ICP) deposition, atomic-layer deposition (ALD), or spin coating.

13. The method of claim 10, wherein the first section of the first gap layer is removed by anisotropic etching.

14. The method of claim 13, wherein the anisotropic etching comprises one of directional reactive-ion-etching, ion-milling etching, or sputter etching.

15. The method of claim 10, wherein the first section of the first gap layer and the second section of the first gap layer are removed substantially simultaneously.

16. The method of claim 1, wherein forming the protective layer comprises:
   depositing the protective layer over the mask and over the first gap layer; and
   removing a portion of the protective layer from over the mask.

17. The method of claim 16, wherein depositing the protective layer comprises a spin-coating process.

18. The method of claim 16, wherein the protective layer comprises a photoresist material.

19. The method of claim 16, wherein removing the portion of the protective layer from over the mask comprises reactive-ion-etching.

20. The method of claim 1, wherein removing the mask comprises wet etching.

21. The method of claim 20, wherein a NaOH-containing solution is used for the wet etching.

22. The method of claim 1, wherein removing the protective layer comprises resist stripping or plasma etching.

23. The method of claim 1, wherein the second gap portion is formed by depositing the second gap material over at least the top surface of the pole.

24. The method of claim 1, wherein the second gap portion is formed by depositing the second gap material over the pole and over the first gap portion.

25. The method of claim 24, wherein the second gap material comprises a non-magnetic material.

26. The method of claim 25, wherein the non-magnetic material comprises at least one of alumina, silicon oxide, silicon nitride, tantalum, tantalum oxide, nickel-chromium alloy, or nickel-niobium alloy.

27. The method of claim 1, wherein the shield is formed by depositing a magnetic material over the second gap portion.

* * * * *